United States Patent [19]

Keske et al.

[11] 4,045,407

[45] Aug. 30, 1977

[54] PROCESS FOR PREPARING AMIDEIMIDE POLYMERS IN THE PRESENCE OF ALCOHOLIC SOLVENT

[75] Inventors: Robert G. Keske; James R. Stephens, both of Naperville, Ill.

[73] Assignee: Standard Oil Company (Indiana), Chicago, Ill.

[21] Appl. No.: 660,715

[22] Filed: Feb. 23, 1976

[51] Int. Cl.$^2$ ............................................. C08G 73/14
[52] U.S. Cl. ............................ 260/47 CP; 260/63 R; 260/75 N; 260/78 TF
[58] Field of Search ............ 260/47 CP, 78 TF, 63 R, 260/75 N, 65

[56] References Cited

U.S. PATENT DOCUMENTS

| | | | |
|---|---|---|---|
| 3,480,588 | 11/1969 | Lavin et al. | 260/47 |
| 3,607,838 | 9/1971 | Strickrodt et al. | 260/78 TF |
| 3,663,728 | 5/1972 | Hoback et al. | 260/29.2 N |
| 3,677,992 | 7/1972 | Morello | 260/32.8 N |
| 3,696,077 | 10/1972 | Suzuki et al. | 260/78 TF |

*Primary Examiner*—Lester L. Lee
*Attorney, Agent, or Firm*—William H. Magidson; Arthur G. Gilkes; William T. McClain

[57] ABSTRACT

Process of producing an amideimide polymer without using an acid having an acyl halide group which comprises reacting a composition comprising an aromatic diprimary amine and a tricarboxylic acid compound in an alcoholic solvent comprising an alkanol containing from 4 to 10 carbon atoms. In those cases where only diprimary aromatic amine is reacted, a tertiary amine is required. If desired, a glycol can be present.

13 Claims, No Drawings

PROCESS FOR PREPARING AMIDEIMIDE POLYMERS IN THE PRESENCE OF ALCOHOLIC SOLVENT

This invention relates to the production of polyamideimides wherein trifunctional aromatic carboxylic acid compound is reacted with a diprimary amine in a monohydric alcohol containing from about 4 to 10 carbon atoms. More particularly, this invention relates to the production of polyamideimides wherein trifunctional aromatic carboxylic acid compound is reacted with an aromatic diprimary amine in the presence of a tertiary amine and an alkanol containing from 4 to 10 carbon atoms.

As is well known, polyamideimides are used for insulation of magnet wire and for the fabrication of articles having high heat resistance. As pointed out in U.S. Pat. No. 3,865,785 of Pauze, these products are usually produced by reacting a mono acid chloride derivative of a tricarboxylic anhydride. Pauze states that these techniques generally require the use of inert expensive solvents, such as N-methylpyrrolidone, dimethyl sulfoxide and the like, which are incapable of reacting with the acyl halide groups. For coating applications, these polyamideimide solutions are further diluted with hydrocarbon solvents to provide lower viscosity solutions than can be attained using cresylic acid or cresylic acid-hydrocarbon systems. Pauze indicates that it would be desirable to provide low viscosity cresylic acid-hydrocarbon solutions of polyamideimide materials and attains his objectives by reacting tricarboxylic acid with polyamine, aliphatic dicarboxylic acid and glycol in cresylic acid thereby producing a coating composition which has a relatively high solids content and low viscosity. While this process may be useful for producing amideimide coating compositions, it is difficult to separate the polymer from the high boiling solvent to provide a molding material and the polymer is chemically substantially different from amide/imide polymers produced by the acyl halide route.

U.S. Pat. No. 3,440,197 of Boldeback discloses the production of amideimide polymers by forming an aqueous-tertiary amine solution of an aromatic polycarboxylic acid and at least one diamine. After a solution of reactants is formed at up to about 65° C, a solid polymer is produced by heating, which can be deposited from the aqueous-tertiary amine solvent system onto a substrate to provide a suitable coating. However, attempts by us to isolate reaction products of this type using all aromatic diamines by driving off water and tertiary amine results in the formation of an infusible material which cannot be used to mold heat resistant articles.

In addition to the aforementioned processes, polyamideimide molding polymers have been prepared by reacting either 4-trimellitoyl halides with diamines or trimellitic acid compound and aromatic diacyl halides with diamines. In either case an inert solvent, such as N,N-dimethylacetamide, is necessary to solvate the reactants. After a low molecular weight polymer is formed, the solid polymer is recovered by mixing with water and cured to a high molecular weight polymer. These processes have the disadvantage of high solvent costs and high acyl halide costs.

The general object of this invention is to provide a new method of producing amideimide polymers. A more specific object of this invention is to provide a new method of producing amideimide polymers from aromatic diamines without using an acid having acyl halide group or groups. Other objects appear hereinafter.

We have now found that the objects of this invention can be attained by reacting a tricarboxylic acid compound (acid or anhydride), preferably trimellitic anhydride with an aromatic diprimary amine in an alcoholic solvent containing a tertiary amine. Surprisingly, this system permits us to avoid the use of aromatic acids containing acyl halide groups and permits us to produce completely aromatic polyamideimides. When these reactants are condensed under the condition of this invention, the polycarboxylic acid compounds and diamines are in solution and produce polyamideimides which are suitable precursors for the production of heat resistant magnet wire enamels and heat resistant molded parts. In the absence of the tertiary amine, the polycarboxylic acid compound and aromatic diamine are incapable of reacting efficiently since these reactants do not form a homogeneous solution in the alcoholic solvent. Apparently the tertiary amine forms a relatively strong salt with the free carboxyl groups, which solvate the aromatic acid and initial reaction products of the aromatic acid and aromatic diamines. This process has the additional advantage that the final cured polyamideimide contains substantially no monohydric alcohol or tertiary amine moieties, which can compromise the physical properties of the resultant amideimide molded objects.

Briefly this invention comprises reacting trimellitic acid compound (trimellitic acid or trimellitic anhydride), aromatic diamine and tertiary amine in an alcoholic solvent to form a low molecular weight polymer, removing the tertiary amine and alcoholic solvent to form a solid low molecular weight polymer. The relatively low molecular weight polymer can then be converted into a high molecular weight polymer by solid state polymerization.

The aromatic diamines useful in this invention include metaphenylenediamine, oxybisaniline, methylenebisaniline, 4,4'-diaminodiphenyl propane, diaminodiphenylsulfide, 4,4'-diaminodiphenylsulfone, 3,4'-diaminodiphenylsulfone, 4,4'-diaminobenzophenone, toluenediamine, metaxylene diamine, etc. For optimum properties, it is preferable to utilize only aromatic diamines since the heat resistance of molded objects decrease when aliphatic diamines are employed.

Suitable tertiary amines include trimethylamine, triethylamine, pyridine, triisopropylamine, tripropylamine, diethylpropyl amine, tributylamine, etc. Triethylamine is preferred since its acid salts have a sufficiently high boiling point that it can be maintained in the reaction medium during the initial stage of the condensation while the free amine has a sufficiently low boiling that it can be removed easily after the formation of the relatively low molecular weight polyamideimide polymer together with the alcoholic solvent.

The alcoholic solvents (monohydric alcohols or alkanols) useful in this invention contain from about 4–10 carbon atoms, such as butanol, secondary butanol, pentanol, hexanol, octanol, 2-ethylhexanol, decanol, etc. Of these, the normal alkanols containing four or five carbon atoms (butanol or pentanol) are preferred since they have sufficiently high boiling points that they are not removed during the initial condensation reaction but have a sufficiently low boiling point that they can be removed easily after the formation of the relatively low molecular weight polyamideimide polymer without extensive esterification of the free carboxyl groups of the amideimide polymer. If the end groups of the amideimide polymer are esterified with alcoholic solvent, it is more difficult to increase the molecular weight of the amideimide polymer during the solid state polymerization stage. The higher boiling alcoholic solvents, such as hexanol, etc., must be removed rapidly from the relatively low molecular weight amideimide polymer. If the higher alcoholic solvents are removed by maintaining the reaction media at reflux over an extended period of time, there is extensive esterification of the higher alkanol. As indicated above, such care is not necessary when employing the lower boiling alkanols such as butanol and pentanol. Lower alkanols are unsuitable due to their low boiling points.

If desired, relatively low boiling glycols, such as ethylene glycol, 1,2-propylene glycol or 1,3-propylene glycol can be employed as reactive cosolvents. In this case, it is also desirable to remove the unreacted alcoholic solvent and glycol rapidly from the low molecular weight amideimide polymer in order to control the number of ester linkages in the amideimide polymer. The reaction of the glycol with the carboxyl groups of the amideimide polymer do not have the drawback associated with the higher monofunctional alkanol since the glycol is not a chain terminator in the subsequent solid state polymerization stage.

In general, the molar ratio of diamine to aromatic poly acid can range from about 1.2:1 to 1:1.2. However, best results are attained using substantially equal molar concentrations. The particular mole ratio is independent of whether or not aromatic dicarboxylic acid is used together with trimellitic acid compound or whether trimellitic acid compound is the sole aromatic acid, since, for all intends and purposes, the trimellitic acid compound reacts primarily as a difunctional acid in this process, i.e., vicinal acyl groups form imide linkages while the non-vicinal acyl groups form amide linkages.

The weight ratio of the tertiary amine to alkanol can range from about 1:19 to about 1:1, depending upon the molecular weight of the particular tertiary amine and alkanol employed. In general, the maximum concentration of the tertiary amine is preferably no more than about 1 mole per mole of the aromatic poly acid, which is more than sufficient to solvate the aromatic poly acid in the alcoholic medium. In those cases where a glycol is employed, the glycol can be present in a concentration up to about 15% by weight of the total concentration of the glycol and alkanol. Above this concentration it is difficult to remove the glycol, and the amideimide polymer tends to have some of the properties of an amideimide ester polymer. Further, excess glycol can lead to undesirable foaming at the high temperature necessary for molding these polymers or gas formation during annealing. While the total concentration of alkanol, tertiary amine and glycol can comprise from 20 to 75% by weight of the reaction mass, we prefer to initiate the reaction at about 50 to 70% solids.

In somewhat greater detail, polyamideimide polymers of this invention can be produced by adding all of the reactants (alkanol, trialkyl amine, aromatic diamine, trimellitic acid compound and any glycol) to a reactor in any order and heating same to reflux. However, it is generally preferred to heat all of the reactants except the trimellitic acid compound to form a homogeneous solution and then add the trimellitic acid compound rapidly to the reactor. This technique generally results in a more uniform product and prevents the formation of small insoluble products. In either case, the reactants are maintained at reflux to distill off the alkanol, trialkyl amine and substantially all of the glycol, if present. Typically approximately 50% of the alkanol, trialkyl amine and glycol is removed in about 30–60 minutes at reflux. The reaction mass is then heated to about 200 to 350° C. Imide formation generally takes place when the reactants are at about 100°–180° C while amide formation takes place at a somewhat higher temperature when the reactants are at about 200°–300° C. Typically, after the reaction is complete, substantially all of the solvents have been removed by distillation, leaving a polymeric amideimide melt having an IV (inherent viscosity) of about 0.1 to 0.3. As indicated above, when alkanols having more than 5 carbon atoms are employed, the alkanols should be removed rapidly from the reaction mixture to avoid chain termination by esterification of the monohydric alcohol. Rapid removal of the higher alkanol can be facilitated by vacuum distillation.

After the polyamideimide is cooled, it is generally ground and then polymerized under solid state polymerization conditions at a temperature of 190° to 350° C. Due to the partial cross-linking during solid state polymerization the exact molecular weight of the polymer can not be determined readily. The resultant amideimide polymer can be used for high temperature molding.

While this invention is primarily directed to the production of amideimide polymers from aromatic diamines and trimellitic acid compounds, substantially the same technique can be employed using aliphatic diprimary amines containing 2 to 12 carbon atoms (ethylenediamine, trimethylenediamine, hexamethylenediamine, dodecamethylenediamine, etc.) and mixtures of diprimary amines and aromatic diamines. In those cases where an aliphatic diamine containing 3 to 12 carbon atoms comprises more than 10 to 20 weight % of the diprimary amine, the process can be carried out in the absence of tertiary amine. Apparently, this reaction product has a lower melting point and/or better solubility than products produced from all aromatic amines.

In somewhat greater detail, polyamideimide containing both aliphatic diamine moieties of from 3 to 12 carbon atoms and aromatic diamine moieties can be produced in the absence of tertiary amines by adding the reactants (alkanol, aromatic diamine, aliphatic diamine, trimellitic acid compound and any glycol) to a reactor in any order and heating same to reflux. In these cases, the aliphatic diamine containing 3 to 12 carbon atoms comprises more than about 10 to 20 weight percent of the diprimary amine and can contain up to about 90 weight percent of the diprimary amines. Generally, it is preferred that the aliphatic diprimary amine containing from 3 to 12 carbon atoms is a polymethylene diprimary amine containing from 3 to 12 methylene units and that said polymethylene diprimary amines comprises from 20 to 50 weight percent of the diprimary amines while an aromatic diprimary amine comprises from 50 to 80 weight percent. As indicated above, the higher the concentration of aromatic diprimary amines, the better the high temperature heat resistance of objects produced from the cured polymers.

As in the case of the polyamideimide polymers produced using trialkyl amine, the reactants are maintained at reflux to distill off the alcohol and substantially all of the glycol, if present. The reaction mass is then heated to about 200°–350° C until substantially all of the solvents have been removed by distillation, yielding a polyamideimide melt having an inherent viscosity of about 0.1 to 0.3 dl/g. The resultant amideimide polymer can then be cooled, ground, and polymerized at 190° to 350° C under solid state polymerization conditions. The resultant amideimide polymers can be used for the highest temperature molding. However, the physical properties of these polymers are somewhat inferior to the physical properties of the fully aromatic amideimide polymers.

The following examples are merely illustrative.

EXAMPLE 1

A three liter 3-necked flask, equipped with a mechanical stirrer and distillation head having a condenser, containing 74.6 grams metaphenylenediamine, 325 grams oxybisaniline, 56 grams ethylene glycol, 400 grams 1-butanol and 140 grams triethylamine, was stirred for 7 minutes while the flask was heated with the bottom half of a spherical heating mantle maintained at 300° F. After the reactants dissolved, 442.3 grams trimellitic anhydride was added over a period of 8 minutes to the stirred contents of the flask. The nitrogen sparge was then started and the heating mantle temperature was raised to about 500° F. After heating for 45 minutes, 403 grams of distillate (glycol, triethylamine and butanol) was collected. The top half of the heating mantle was then placed around the flask and the heating mantle temperature was raised to 560° F. After the viscous polymer was heated from an additional 1.1 hours, the heating mantle was turned off, the polymer cooled and ground. The amideimide polymer had an inherent viscosity of 0.22 dl/g (0.5% w/v in 60:40 (w/w) phenol:-tetrachloroethane at 25° C). The molecular weight of the amideimide polymer was increased by solid state polymerization by placing the composition in a circulating air oven for 16 hours at 400° F, 3 hours at 500° F and 45 minutes at 600° F. The solid stated amideimide polymer was compression molded into plaques at 650° F. Tensile bars had a tensile strength of 12,000 psi and the plaques did not show any gassing or distortion after heating at 450° F for 24 hours followed by 500° F for 24 hours.

The above data indicates that it is possible to produce fully aromatic polyamideimide polymers without use of a polyfunctional acyl halide and that the resultant molded objects have high tensile strength and do not gas or distort on heating or annealing at high temperatures.

EXAMPLE 2

This example illustrates the production of a fully aromatic amideimide polymer using 1-hexanol as the alkanol. The process described in Example 1 was repeated using an initial change of 396 grams methylenebisaniline, 35 grams ethyleneglycol, 400 grams 1-hexanol, 140 grams triethylamine and 384 grams trimellitic anhydride. Nitrogen sparging was carried out at 250 cc/min and the bottom half of the spherical heating mantle was set at 500° F. Fifteen minutes after heating was started distillation began and the to half of the heating mantle was turned on. After 5 additional minutes, approximately 100 ml. of hexanol was collected as condensate from the clear reaction mass and the temperature of the mantle was set at 560° F. Twenty minutes later, a total of 449.3 grams of condensate was collected. Thirty minutes later, a total of 597.7 grams condensate was collected and a house vacuum (15 inches Hg) was drawn on the system. Five minutes later, the heat and vacuum were turned off and the polymer was allowed to cool. The resultant amideimide polymer had an inherent viscosity of 0.22 dl/g at 0.5% w/v in 60/40 w/w phenol: tetrachloroethane.

EXAMPLE 3

This example illustrates the use of pyrridine as the tertiary amine and a mixture of aromatic and aliphatic diamines. The process described in Example 1 was repeated using an initial change of 66.8 grams hexmethylene diamine, 442.3 grams trimellitic anhydride, 338.1 grams methylenebisaniline, 100 grams pyrridine, 300 grams 1-butanol and 2 grams trisnonylphenylphosphite catalyst. The bottom half of the spherical heating mantle was set at 620° F and the nitrogen sparge was started. Ten minutes after heating was started, the top half of the heat mantle was turned on. Distillation of solvents stopped 50 minutes later yielding an extremely viscous polymer. The heat was turned off and the polymer was allowed to cool and ground. The polymer having an inherent viscosity of 0.21 dl/g was polymerized overnight under solid state conditions at 450° F under high vacuum.

EXAMPLE 4

This example illustrates the use of secondary butanol as the alkanol and a mixture of aromatic and aliphatic diamines in the absence of any tertiary amine. The technique described in Example 1 repeated using an initial change of 66.8 grams hexamethylene diamine, 442.3 grams trimellitic anhydride, 342 grams methylenebisaniline and 400 grams secondary butyl alcohol. A few minutes after the spherical heating mantle was set at 530° F an exothermic reaction started. Twenty-five minutes after heating was initiated, about 300 ml of condensate was collected. Over the next 5 minutes, 1.9 grams of trisnonylphenylphosphite catalyst was added. The top half of the heating mantle was then turned on and the nitrogen sparge was begun. 5 minutes later approximately 480 ml of condensate was collected and the temperature of the heating mantle was set at 620° F. Thirty minutes later, the heat was turned off, the amideimide polymer cooled and ground. The polymer having an inherent viscosity of 0.29 dl/g was polymerized overnight under solid state condition at 450° F under high vacuum.

EXAMPLE 5

This example illustrates the use of a mixture of aromatic and aliphatic diamines using 1-pentanol as the alcohol in the absence of any tertiary amine. The process described in Example 1 was repeated using an initial change of 66.8 grams hexamethylene diamine, 442.3 grams trimellitic anhydride, 800 grams 1-pentanol, 342 grams methylenebisaniline, 1.6 grams of 50% aqueous sodium hydroxide and 2.64 grams of a 50% aqueous hypophosphorus acid. (The sodium hydroxide and hypophosphorus acid constituted the catalyst for this reaction.) The bottom half of the heating mantle was set at 480° F and after 80 minutes the theoretical amount of water of imidization was collected. The nitrogen sparge was started and the temperature (top and bottom) was set at 620° F. After another 80 minutes, approximately 940 ml distillate was collected, yielding a very viscous amideimide polymer in the reaction vessel. The heat was turned off and the amideimide polymer was cooled and ground yielding a polymer having an inherent viscosity of about 0.22 dl/g. The polymer was solid state polymerized overnight at 450° F under high vacuum.

We claim:

1. The process of producing an amideimide polymer without using an acid having an acyl halide group, which comprises reacting a composition comprising an aromatic diprimary amine and a tricarboxylic acid compound selected from the group consisting of trimellitic acid and trimellitic anhydride in an alcoholic solvent containing a tertiary amine wherein said alcoholic solvent comprises an alkanol containing from 4 to 10 carbon atoms.

2. The process of claim 1, wherein said composition contains substantially no aliphatic diprimary amines.

3. The process of claim 2 wherein said alkanol is selected from the group consisting of 1-butanol and 1-pentanol and the weight ratio of tertiary amine to alkanol is from about 1:19 to about 1:1.

4. The process of claim 3, wherein said reaction is carried out in the presence of a glycol and said glycol is present in a concentration up to about 15% by weight of the total concentration of the glycol and alkanol.

5. The process of claim 4, wherein said reaction is initiated at about 50 to 70% solids.

6. The process of claim 1, wherein said aromatic diamine comprises at least one diamine selected from the group consisting of metaphenylenediamine, oxybisaniline and methylenebisaniline.

7. The process of claim 1, wherein an aliphatic diprimary amine containing 2 to 12 carbon atoms and an aromatic diprimary amine are reacted.

8. The process of claim 1, wherein said composition comprises at least one dicarboxylic acid selected from a group consisting of terephthalic acid and isophthalic acid.

9. The process of producing an amideimide polymer without using an acid containing an acyl halide group which comprises reacting a composition comprising an aromatic diprimary amine, an aliphatic polymethylene diprimary amine containing from 3 to 12 methylene units and a tricarboxylic acid compound selected from the group consisting of trimellitic acid and trimellitic anhydride in an alcoholic solvent comprising an alkanol containing 4 to 10 carbon atoms wherein the aliphatic diprimary amine comprises from about 10 to 90 weight percent of the diprimary amines.

10. The process of claim 9, wherein the polymethylene diprimary amine comprises from 20 to 50 weight percent of the diprimary amines and the aromatic diprimary amine correspondingly comprises from 50 to 80 weight percent.

11. The process of claim 10, wherein said composition comprises a tertiary amine.

12. The process of claim 10, wherein said alkanol is selected from the group consisting of 1-butanol and 1-pentanol.

13. The process of claim 10, wherein said composition comprises a glycol and the glycol is present in a concentration up to about 15% by weight of the total concentration of the glycol and alkanol.

* * * * *